3,515,516
METHOD FOR DETERMINING FEMALE HORMONE DEFICIENCY

Robert R. Horton, Santa Barbara, Calif., assignor, by direct and mesne assignments, to St. Croix Research Company, St. Paul, Minn., a corporation of Minnesota
No Drawing. Filed Dec. 28, 1965, Ser. No. 527,632
Int. Cl. G01m *15/02*
U.S. Cl. 23—230            4 Claims This invention relates to a method and apparatus for determining the adequacy of female hormone production particularly as it effects the status of a pregnancy and/or reflects the function of ovaries in a non-pregnant female.

Once a physician has established that a human female is pregnant, it is often advisable to determine the status of the pregnancy. Many women have a tendency to abort. Such abortions, which usually occur in the first three to four months of the pregnancy, may be due to many causes, however, in many instances these abortions (miscarriages) may be due to insufficient hormone production. Thus, women who have the tendency to abort and who desire children generally seek out a physician at the first sign of pregnancy. Upon being advised of the circumstances, the physician, after the pregnancy has been established, attempts to determine the status of the pregnancy to ascertain whether or not supplemental hormones, or their synthetic equivalents, may be helpful. Because of possible undesirable side effects, the indiscriminate use of hormones should be avoided unless the condition of the patient warrants their use. Thus, the accurate determination of hormone deficiency becomes quite important.

It has long been known that when a woman is pregnant, progesterone produced by the placenta and ovaries causes the cells lining the vagina to slough off prior to reaching maturity in a normal pregnancy. Also, during the menopausal period and at other times the activity of the ovaries may be such as to create hormone imbalances which may cause the human female both mental and physical distress, and quite possible reveal infertility. Thus, the examination of vaginal smears (which comprise primarily epithelial cells from the wall of the vagina) has become a commonly used diagnostic aid. However, vaginal smears may contain other cells in addition to the epithelial cells, e.g. white blood cells and the like and other foreign materials such as are often found in the vagina which could confuse the untrained observer. Moreover, in a vaginal smear many of the cells may be lysed in pregnancy, this cellular disintegration further distorting examinations of the vaginal smear. Thus, heretofore such smears have usually been set to a laboratory for examination and report.

It is the primary purpose of this invention to provide a procedure for determining the state of hormone production in females which eliminates the necessity for sending vaginal smears to a laboratory. I have also discovered that the cells lining the urinary bladder are the same as the cells lining the vagina in certain essential respects, particularly with respect to the development of the cell nuclei. When a woman is pregnant, progesterone produced by the placenta causes the cells lining the bladder, as well as those lining the vagina, to slough off prior to reaching maturity.

Because the cells obtained from urine are generally clean, fresh and uncontaminated, as being in the bladder they are washed out frequently, an examination of these cells may be readily carried out even by the most inexperienced observer, to obtain an accurate indication of hormone deficiency in the patient, which of course, may lead to an undesired miscarriage.

The procedure of this invention can be carried out simply and efficiently with a minimum of equipment. A vaginal smear or preferably a urine sample is obtained from the pregnant female. The urine is centrifuged and the cells of the sediment obtained by centrifuging examined under a microscope. For purposes of examination a simple kit may be provided composed of a cell staining solution, cover slip, microscopic examining slide, and a swab. To facilitate examination and enable proper identification of cell nuclei the microscopic slide should be specially calibrated to facilitate cell examination, e.g. prepared with line markings five microns apart over the area on which the smear sample is to be placed. The calibration may be on the cover slip if desired since in either event the result is a calibrated microscopic slide. The smear sample from the vagina or urine sediment is placed on the slide. The staining solution used is preferably cresyl violet, which may be prepared by dissolving the cresyl violet in a suitable solvent e.g. butanol-acetic acid-water solution. When 2 drops of this staining material is placed on the sediment mounted on the microscopic slide, the cell nuclei take on a purple hue and are readily singled out for size determination by microscopic examination.

The cells which are not matured have larger nuclei than those which are matured. In the event seventy (70%) percent or more of the larger nuclei are present the indication is one of good progesterone production and from this aspect the pregnancy may be considered normal. In the event of the presence of red and white blood cells in addition to the epithelial cells, these are readily distinguishable because of the absence of any significant amount of cytoplasm surrounding their nuclei; the epithelial cell nuclei are always surrounded by a large expanse of cytoplasma.

In the event more than thirty (30%) percent of the cell nuclei appear to have a size smaller than five microns there is at least a likelihood that the patient is generating an insufficient amount of progesterone. With this information a physician can safely prescribe hormones to correct the inbalance and possibly prevent an abortion. Of course, in the event less than thirty (30%) percent of the cell nuclei appear to be smaller than five microns, it is quite probable that the natural hormone secretion is sufficient.

There is thus provided by the present invention an extremely simple, readily carried out test procedure for determining the status of a pregnancy, which test procedure is applicable also to ascertain the possibility of hormone insufficiency in non-pregnant women also, e.g. those who have infertility or menopausal problems.

I claim:

1. A method for determining the progesterone balance in a human female which comprises subjecting a sample of the cells obtained from a vaginal smear or from centrifuging a urine sample of such female for microscopic examination on a surface having calibrated markings thereon of about 5 microns whereupon cells within the field of observation having nuclei greater than this diameter may be readily distinguished from those cells within the field of vision having nuclei of smaller diameters, and from such observation ascertaining the approximate proportion of cells present having nuclei of a size greater than about 5 microns and thereby estimating the progesterone balance of such female.

2. The method of claim 1 wherein the sample is stained to permit greater visibility.

3. The method of claim 2 wherein the markings on said surface are in the form of line markings 5 microns apart, which lines are parallel to and spaced from one another.

4. The method of claim 3 wherein the staining agent is a solution of cresyl violet.

References Cited

Manual of Cytotechnology, National Committee for Careers in Medical Technology, 1962, pp. 20–6, 26–1–6, 28–2–3, 31–1, 3–6, 55–1, 3–9.

Lewis, M. R. et al., Chemical Abstracts, 41, 6974 (1947).

Prévot, A. R. et al., Chemical Abstracts, 42, 251 (1948).

Ritter, C. et al., Chemical Abstracts, 55, 10555 (1961).

Aloe Laboratory Apparatus, Equipment, Reagents; catalog #103, pp. 636–8 (1952).

MORRIS O. WOLK, Primary Examiner

E. A. KATZ, Assistant Examiner

U.S. Cl. X.R.

424—2, 3